US012523987B2

(12) United States Patent
Bernstein

(10) Patent No.: US 12,523,987 B2
(45) Date of Patent: Jan. 13, 2026

(54) BABY FORMULA DISPENSER WITH ACCURACY VERIFICATION

(71) Applicant: Cuddletot LLC, Eatontown, NJ (US)

(72) Inventor: Yosef Bernstein, Eatontown, NJ (US)

(73) Assignee: Cuddletot LLC, Eatontown, NJ (US)

( * ) Notice: Subject to any disclaimer, the term of this patent is extended or adjusted under 35 U.S.C. 154(b) by 0 days.

(21) Appl. No.: 19/204,695

(22) Filed: May 12, 2025

(65) Prior Publication Data

US 2025/0271837 A1    Aug. 28, 2025

(51) Int. Cl.
| G05B 19/416 | (2006.01) |
| A23L 33/00 | (2016.01) |
| B01F 23/50 | (2022.01) |
| B01F 35/83 | (2022.01) |

(52) U.S. Cl.
CPC ............ *G05B 19/416* (2013.01); *A23L 33/40* (2016.08); *B01F 23/50* (2022.01); *B01F 35/832* (2022.01); *G05B 2219/37371* (2013.01)

(58) Field of Classification Search
CPC ........ G05B 19/416; G05B 2219/37371; A23L 33/40; B01F 23/50; B01F 35/832
See application file for complete search history.

(56) References Cited

U.S. PATENT DOCUMENTS

| 5,857,589 | A | * | 1/1999 | Cline | ................. | B05C 11/1005 |
| | | | | | | 222/63 |
| 6,829,431 | B1 | | 12/2004 | Haven et al. | | |
| 8,167,006 | B1 | | 5/2012 | Mathis et al. | | |
| 8,360,279 | B1 | * | 1/2013 | Giles | ..................... | B01F 33/846 |
| | | | | | | 222/145.6 |
| 9,847,265 | B2 | * | 12/2017 | Donner | ................... | H01L 22/26 |
| 11,503,943 | B2 | | 11/2022 | Adams | | |
| 2005/0238341 | A1 | | 10/2005 | Thaler et al. | | |
| 2006/0150821 | A1 | * | 7/2006 | Paul | ....................... | A47J 31/401 |
| | | | | | | 99/279 |
| 2006/0210430 | A1 | * | 9/2006 | Lark | .................... | G05D 11/132 |
| | | | | | | 422/62 |

(Continued)

OTHER PUBLICATIONS

Baby Brezza, Baby Formula Dispensers, "https://babybrezza.com/collections/baby-formula-dispensers-mixers", last accessed May 12, 2025.

*Primary Examiner* — Christopher E. Everett
(74) *Attorney, Agent, or Firm* — Tatonetti IP

(57) ABSTRACT

A baby formula dispensing device is configured to automatically dispense water and powdered baby formula into a bottle and implement various accuracy checks to ensure the prepared mixture is accurate and safe for the baby. A user may input or select a pre-set option for the dispensing device to output a certain amount of formula and water to create the mixture in the bottle. The dispenser device may be filled with formula and water into independent reservoirs or otherwise receive the formula and water. The dispenser automatically measures and dispenses the correct amount of water and formula and dispenses into a bottle. Various sensors are utilized within the dispensing device to ensure the correct amount of formula and water is actually dispensed. Sensors may be placed on the water and formula dispensing circuits and on the scale on which the bottle sits, to perform multiple checks of the bottle's preparation.

17 Claims, 12 Drawing Sheets

(56) References Cited

U.S. PATENT DOCUMENTS

2006/0278093 A1* 12/2006 Biderman ........... A47J 31/5253
99/282
2010/0001019 A1* 1/2010 Sollazzo .............. G01G 13/026
222/77

* cited by examiner

FIG 3
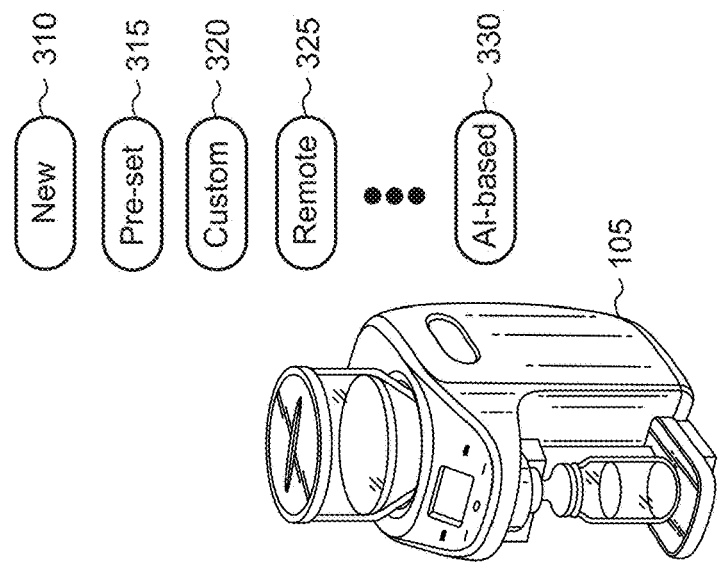
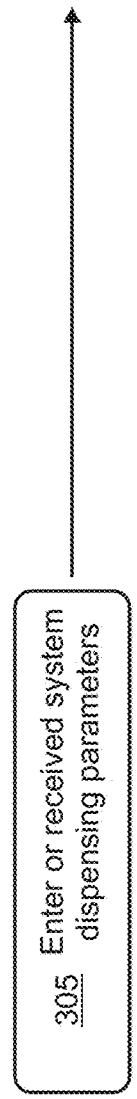

BABY FORMULA DISPENSER WITH ACCURACY VERIFICATION

BACKGROUND

Baby formula dispensers allow parents or guardians to easily prepare a bottle for their infant. Some guardians are concerned that the prepared bottle may not be accurate or safe for their infant, which is understandably frightening.

SUMMARY

A prepared baby formula dispensing device is configured to automatically dispense water and powdered baby formula into a bottle and implement various accuracy checks to ensure the prepared mixture is accurate and safe for the baby. Initially, a user may input some information about the formula brand, powder, or other formula composition, and the baby's characteristics like age, weight, and height, among other information, so that the dispensing device can prepare the water-formula mixture informatively. Dispensing options may alternatively be pre-set or otherwise received by the dispensing device, such as from a remote service or a user's smartphone. The dispensing device may be filled with formula and water in independent reservoirs or otherwise receive the formula and water. Upon receiving input to create the baby bottle mixture, the dispensing device automatically measures and dispenses the correct amount of water and formula and outputs each into a bottle.

Once the bottle has the completed mixture, the base on which the bottle rests to receive the dispensed mixture includes a scale or other weighing mechanism to check the bottle's weight after the scale has been zeroed out. Performing this check ensures that the correct amount of water and formula was output, thereby assuring the parent or guardian. One or more sensors may likewise be associated with the water dispensing track and the formula dispensing track to measure the individual amounts output into the bottle. All of these measurements may be utilized by the dispensing device to ensure the prepared formula bottle is accurate and safe.

The sensors and scale interoperate with the dispenser's onboard software. For example, the dispenser's processor receives one or more measurements and checks them with various other parameters, such as measured water or formula via respective measurement sensors, the set instructions on how much formula and water to dispense for that feeding, among other factors that may check the mixture's accuracy and safety. For example, the weighed amount of the prepared mixture may be checked with the combined amount of the sensed water output and the formula output. The mixture may further be checked with the input parameters for that specific bottle (i.e., six ounces of mixed formula and water to be given to the baby).

When one or more checks are verified, the dispenser may output the results to the user, such as a green light or "APPROVED" output on a screen, or, alternatively, a red light or "PROBLEM" output to alert the user that there may be an inaccuracy with the bottled mixture. Alternatively or additionally, a sliding scale may be provided to the user, such as a 0-100% assurance check, a YELLOW light indicating the bottle is within an acceptable range of error or that there may be a potential problem, etc. In terms of an error threshold or range, for example, if the prepared mixture is 0.05 ounces off, then that may be within the "appropriate" range to approve the mixture. Threshold checks may alternatively be within a percentage, given that a 0.05 ounce difference is more significant for a two-ounce bottle versus an eight-ounce bottle. In some implementations, users may input their "threshold" check range.

Additional checks and indicators may also be in place. For example, while the water and formula are being automatically dispensed, such as via a valve, indicator lights individually associated with the formula and water may flash green upon the sensed accurate amount being dispensed. This way, the user receives some comfort as soon as the ingredients are output, and the final check with the scale further verifies the mixture. An additional alert may be in place to notify the user that the dispenser also checked the proper and programmed output for that baby, either with a green light or on a display screen that says, for example, "checking the baby's dosage." Of course, output ranges may be set for each sensed stage, such as a yellow, red, or green light for the formula dispenser, water dispenser, and combined measurement by the scale. Other output stages may also be created during the process.

In the event there is some error at any of the checkpoints or stages mentioned above, the dispenser is configured with a troubleshooting application to locate the problem. Such a troubleshooting application may include, for example, individually dispensing a pre-set amount of water (e.g., four ounces) and checking the amount output at the water's associated sensor and then the scale. This process may repeat for the formula. Notifications may be presented to the user to let them know they should clean certain parts of the dispenser, such as hoses, reservoirs, etc., and/or to rinse the machine now or periodically.

The dispenser may include other types of sensors, such as backup sensors, that detect problems, such as a clogged hose. For example, pressure sensors may detect that the typical pressure expected at various hoses is over or under the threshold norm, indicating a clog, leak, etc. Vision sensors, such as a camera, UV, infrared, etc., may also be used to sense debris or holes and notify the user accordingly.

User notifications may be displayed on an onboard screen or other output device associated with the dispenser or communicated to the user over Wi-Fi, Bluetooth®, etc., to a locally instantiated smart dispenser application on the user's smartphone device.

Finally, the dispensing device and/or user application may be configured to notify the user to clean certain dispenser areas periodically, such as every two months. Such alerts further help guardians know that their dispenser is operating properly and safely.

BRIEF DESCRIPTION OF THE DRAWINGS

FIG. 3 shows an illustrative representation of the bottle dispensing device receiving dispensing parameters;

DETAILED DESCRIPTION

Figure 1:
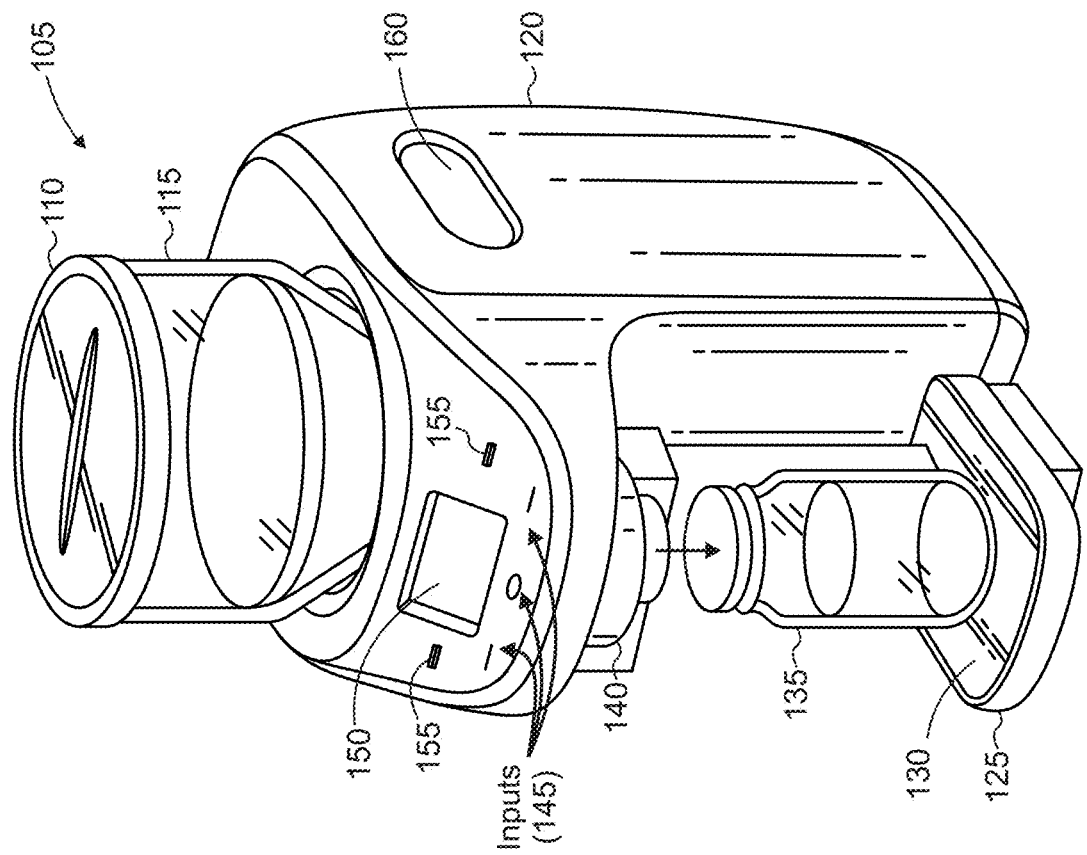
FIGS. 1 and 2 show illustrative representations of a baby bottle dispensing device.
Figure 2:
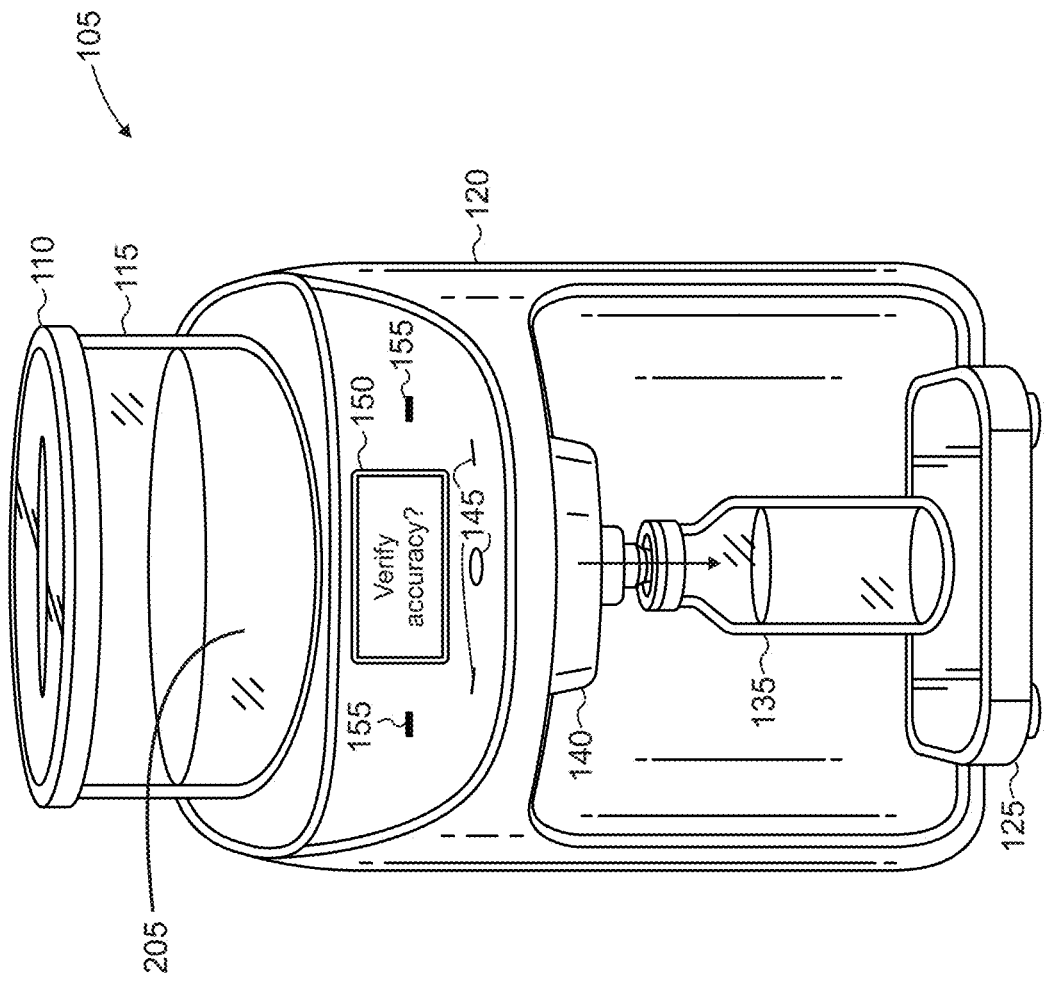

FIGS. 1 and 2 show illustrative representations of a baby formula dispensing device (referred to herein as the "device" or "dispensing device") that includes a water reservoir 120 and a formula reservoir 115 for dispensing into a bottle 135 for consumption by a baby. The water reservoir 120 may be a removable door that includes a tank the user fills up, and then can be put back into place and secured to the body of the device 105. A window 160 may be present so the user can check the water amount within the reservoir 120. The formula reservoir 115 includes a lid 110 that the user removes to input the baby formula. Typically, baby formula may be in powdered form, however, liquid may also be possible in some scenarios. The dispensing device takes the formula and water and dispenses them into the bottle 135. This way, a parent or guardian has a prepared infant formula bottle without having to measure the quantities out each time, and can instead, essentially request the prepared bottle on the fly.

The dispensing device 105 includes various input/output (I/O) devices, such as a display screen 150, lights 155, and buttons 145. While only some I/O devices are shown in the drawings, other I/O devices are also possible, such as touchscreen displays, speakers, microphones, keyboard, or remote input via, for example, a user's smartphone device. The user may use the buttons or other input mechanisms to control the device 105, such as to change the amount of formula or water, adjust the size or amounts of the prepared formula, adjust the temperature of the prepared formula, etc. For example, the lights and display may be used to inform the user about the prepared formula, such as whether the dispensing is complete, the stage within the preparation process, whether the prepared bottle's preparation is accurate or inaccurate, maintenance or repair reminders, etc.

The dispensing device 105 includes a nozzle 140 that may include, for example, a nozzle that outputs the prepared contents. Depending on the system's exact setup, the nozzle may dispense the formula, water, or the combined contents. In some embodiments, the nozzle 140 may be considered a mixing nozzle or outlet where the water, heated or otherwise, from the water line and measured powder from the formula line converge before entering the bottle. Internally, the mixing nozzle may contain two or more inlets (one for water, one for powder) and a short mixing chamber or baffle that ensures the streams merge uniformly. Some designs may rely on turbulence, while others may use a small static mixer insert. Because the nozzle is the last wetted component before the bottle, it may be manufactured from food-grade stainless steel or high-temperature polymer, be detachable for cleaning, and may include an internal check valve to prevent back-flow of liquid into either upstream circuit.

To deliver the ingredients into a bottle 135, the device utilizes one or more hoses (or tubing) routed from each reservoir to the nozzle 140 positioned above or otherwise adjacent to the bottle's opening. When the user initiates a dispensing operation (manually or automatically), a control mechanism such as an electronic valve, pump, or gravity-actuated system selectively opens the flow path from the water reservoir and/or the formula reservoir.

Water may be delivered through a water hose directly from the water reservoir, while formula, which may be in liquid, concentrated, or powder form, is delivered via a formula hose. At the nozzle 140, the device 105 may either sequentially deliver the water and formula separately into the bottle, or simultaneously deliver the streams to mix within the bottle. The hoses can be connected to valves that control the volume, timing, and ratio of dispensed water and formula to ensure proper preparation consistency. After dispensing, the device may perform a partial rinse cycle to maintain the cleanliness of the internal routing system.

The bottle dispensing device 105 also includes a scale or measuring device 125 (hereinafter referred to as a "scale" or "measuring device") that the bottle 135 rests on. The bottle is positioned on the platform 130 that is integrated into or is above the scale 125. The scale may be digital, which determines the weight of the bottle 135 by converting the deflection of an internal load cell into an electronic signal that is then processed as a numeric value, which may be displayed or otherwise utilized by the dispensing device 105. When a bottle is placed on the weighing platform, it exerts a downward force proportional to its mass. This force slightly deforms the load cell's strain gauges, changing their electrical resistance. The scale's microcontroller measures that resistance change, applies temperature and linearity compensation, and translates the result into a precise weight reading, which may be in grams, ounces, milliliters, etc.

Some higher-end scales 125 may incorporate auto-tare and overload protection: the auto-tare function can zero out the weight of an empty bottle 135, allowing the user to measure only its contents, while overload sensors prevent damage if the applied load exceeds the cell's rated capacity. Together or individually, these features ensure fast, repeatable, and accurate bottle measurement. In the present scale, the system would zero out the scale's weight when the bottle is placed on it, whether manually responsive to some user input, such as using input buttons 145 or touchscreen display 150 on the device 105, or automatically. Such readings may be transmitted to an onboard system processor, as discussed in greater detail below.

FIG. 3 shows an illustrative representation in which the dispensing device 105 receives system dispensing parameters, either via entered user input or otherwise received, as representatively shown by reference numeral 305. In this regard, the dispensing parameters may be new 310 (e.g., it's a new parameter for a first use or due to a change in the baby's weight or requirements), pre-set 315 (e.g., the user selected a pre-set dispensing parameter that may have been previously input by the user or was pre-set by the manufacturer within its software), custom 320 (e.g., the user enters some custom output of water to formula ratio), remote 325 (e.g., the dispensing device receives some remote dispensing parameters from a remote service or the user's computing device, such as a smartphone), or AI (Artificial Intelligence)-based 330 (e.g., an AI engine determines the correct amount based on known data, such as formula used, baby physiological data like age, weight, height, etc.). Typically, prepared baby formula bottles require a correct ratio of water to formula. So, for example, some baby formulas may require one scoop of formula per two mL of water, and the amount of water may depend on the baby's age, size, or another characteristic. It is important to get such a prepared formula correct to ensure the baby is growing proportionately, healthily, and getting the proper amount of formula and hydration. Different formulas may have different requirements, so the dispensing device may come equipped with pre-set "common" prepared formula output options, or other options as shown in FIG. 3 may also be possible.

Figure 4:
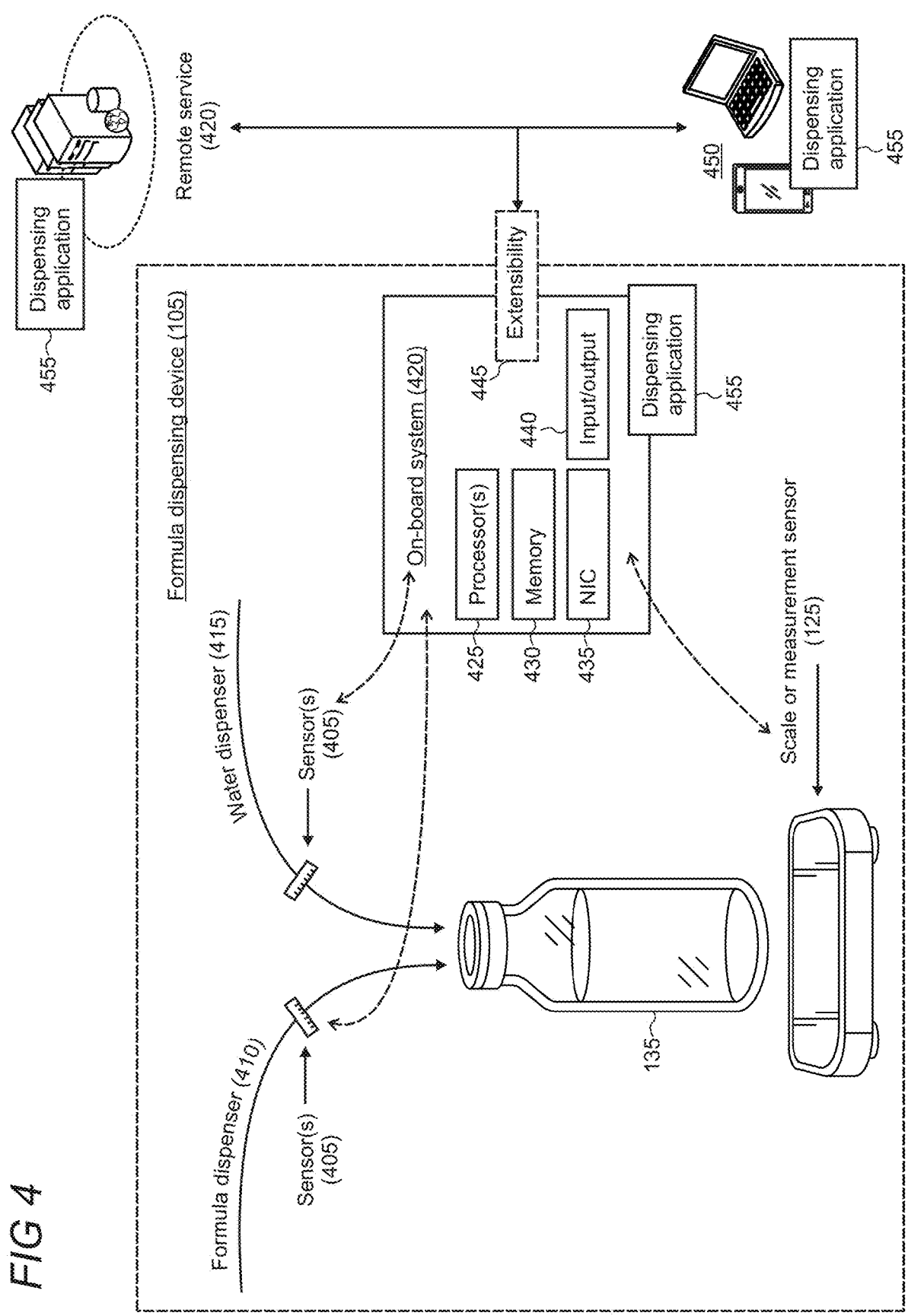
FIG. 4 shows an illustrative representation of the bottle dispensing device's architecture.

FIG. 4 shows an illustrative environment in which the nature of the dispensing device's operations is shown. For example, the dispensing device includes a formula dispenser 410 and a water dispenser 415, which, in typical implementations, are distinct components, dispensers, tubes, reservoirs, etc., and then combined into the bottle 135. Each dispenser may have a discrete sensor 405 within its dispensing track to determine an amount of formula and water that was dispensed. For example, when the dispensing device 105 is set to output four mL of water and 16 grams of powdered formula. To ensure the correct amount of formula and water is dispensed, the respective sensors measure the amount that is dispensed.

For the water dispensing circuit 415, an in-line flow-measurement module may be installed between the reservoir outlet and the dispensing nozzle. A compact turbine or ultrasonic flow sensor (e.g., 1%4-inch sanitary Tri-Clamp body) can be inserted in the silicone or PTFE feed tube using standard compression or barbed fittings; its threaded or clamp ferrules can make a leak-tight mechanical joint, while a two-pin or three-wire pigtail carries the pulse (turbine) or 4-20 mA/TTL (ultrasonic) signal to the on-board system 420. This is but one implementation example, and other sensors and configurations may also be possible.

For the formula or powder dispensing circuit 410, accurate measurements may be achieved by using either a weigh-belt hopper or an auger-screw dispenser. In a weigh-belt scheme, the entire formula hopper can sit on three or four low-profile shear-beam load cells mounted to the chassis with M6 or M8 mounting plates and anti-rotation dowels; each cell's cable is routed through a strain-relief gland to a summing board and A/D converter. The processor 425 on the on-board system 420 can open a rotary gate until the load-cell feedback matches the target gram value, then recloses. In an auger drive, a hall-effect or optical encoder is affixed to the auger motor shaft with a set-screw collar; each counted revolution dispenses a known powder mass, verified during factory calibration. In some implementations, a capacitive or microwave bulk-flow sensor can be clamped around a short, straight powder chute using food-grade neoprene gaskets to create a hermetically sealed environment; it outputs a mass-flow-proportional signal without contacting the powder. Other sensors and configurations for measuring the formula dispenser are also possible.

Sensory data gathered by the formula and water dispenser sensors 405 and scale 125 are transmitted to the on-board system 420 for processing and utilization. The on-board system includes one or more processors 425, memory 430 which can include executable instructions and data, a NIC (network interface controller) 435 to enable wireless or wired network connectivity (e.g., over Ethernet, Wi-Fi, Bluetooth®, NFC (near field communication)), and an input/output (I/O) 440 devices, such as a touchscreen display, mechanical buttons or switches, LED (light emitting diode) lights of one or more colors, speakers, microphones, and any other I/O devices to effectuate the features described herein.

While certain I/O devices are shown in FIGS. 1 and 2, other I/O devices are also possible to effectuate the functions and features described herein.

Relying on the NIC 435, the dispensing device 105 is configured with extensibility 445 to external and remote computing devices, such as a remote service 420 and/or user computing devices 450, including smartphones, tablet computers, laptop computers, personal computers, etc. Such extensibility may be so data can be exchanged between the remote service and user computing devices, or so the remote service and user devices can control the dispensing device's actions such as creating a prepared formula bottle, adjusting the system dispensing parameters 305 (FIG. 3), or reviewing a dispensing history so that the parent or guardian knows how much formula the baby has eaten that day and/or previously. Physicians may also utilize such dispensing data to monitor the baby's intake.

The dispensing application 455 may effectuate the various actions described herein, including controlling the water dispenser 415, formula dispenser 410, various sensors, outputs, inputs, and transmissions to the remote devices. In this regard, the remote service 420 and user devices 450 may likewise be configured with a version of the dispensing application 455 to interoperate with the dispensing device's application 455.

Figure 5:
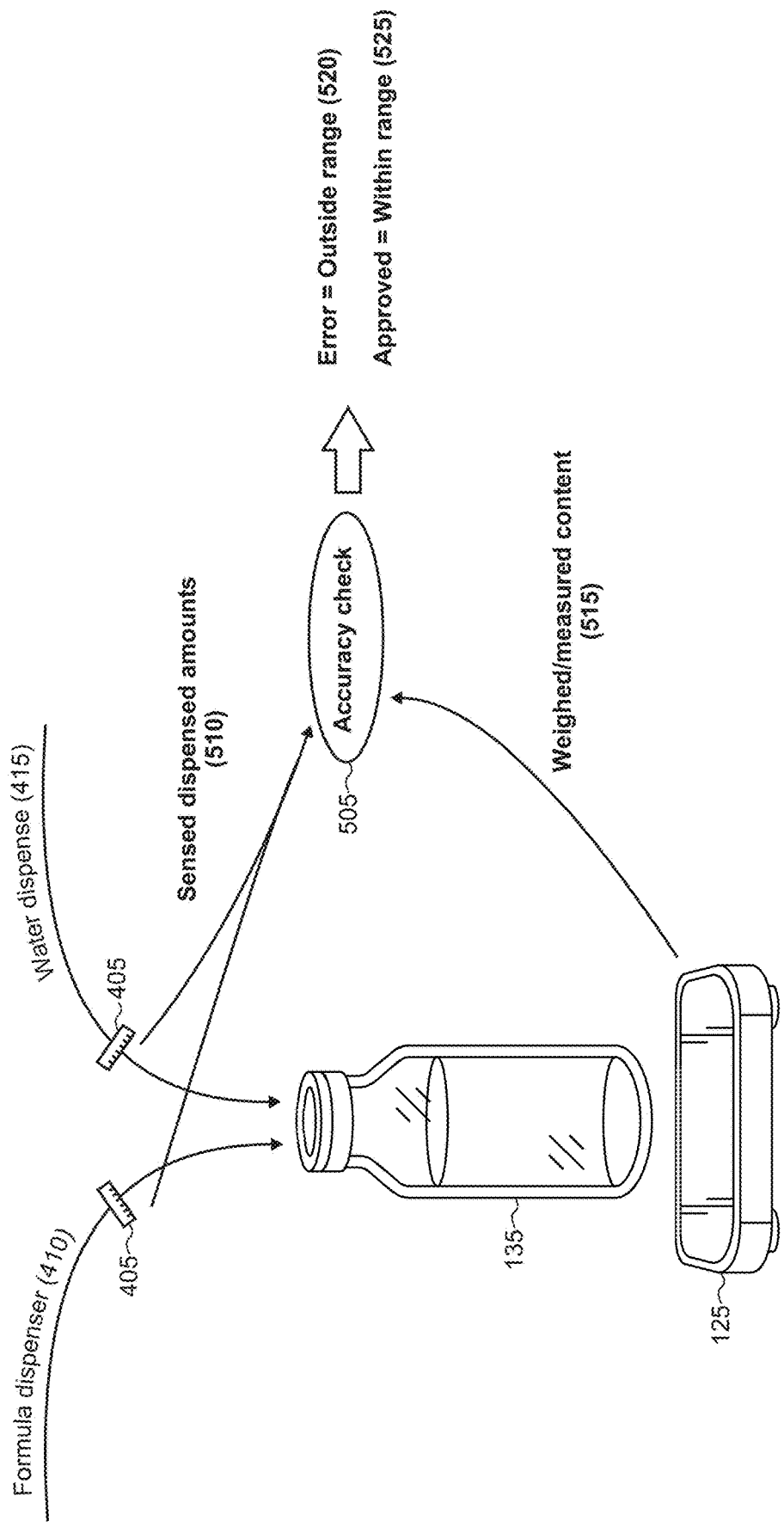
FIG. 5 shows an illustrative representation of an accuracy check application for prepared bottles.

FIG. 5 shows an illustrative representation in which, using the dispensing application 455 on the on-board system 420, an accuracy check 505 is performed for all dispensed levels and amounts. The sensed dispensed amounts 510 for the formula dispenser 410 and water dispenser 415 are checked either one or both of individually or collectively. Furthermore, the weighed/measured content 515 by the scale 125 is checked. In this regard, the system may take the combined amounts from the water and formula dispenser sensors 405 and check to see if the dispensed amounts align with what the scale measured. If the combined formula and water amounts are equal to or at least within an acceptable range to the scale measurement, then the system may output an approval, as representatively shown by reference numeral 525. In contrast, if the total amount measured by the scale is outside of an acceptable range from the two amounts measured by the water and formula sensors 405, then an error message may be output, as representatively shown by reference numeral 520.

Figure 6:
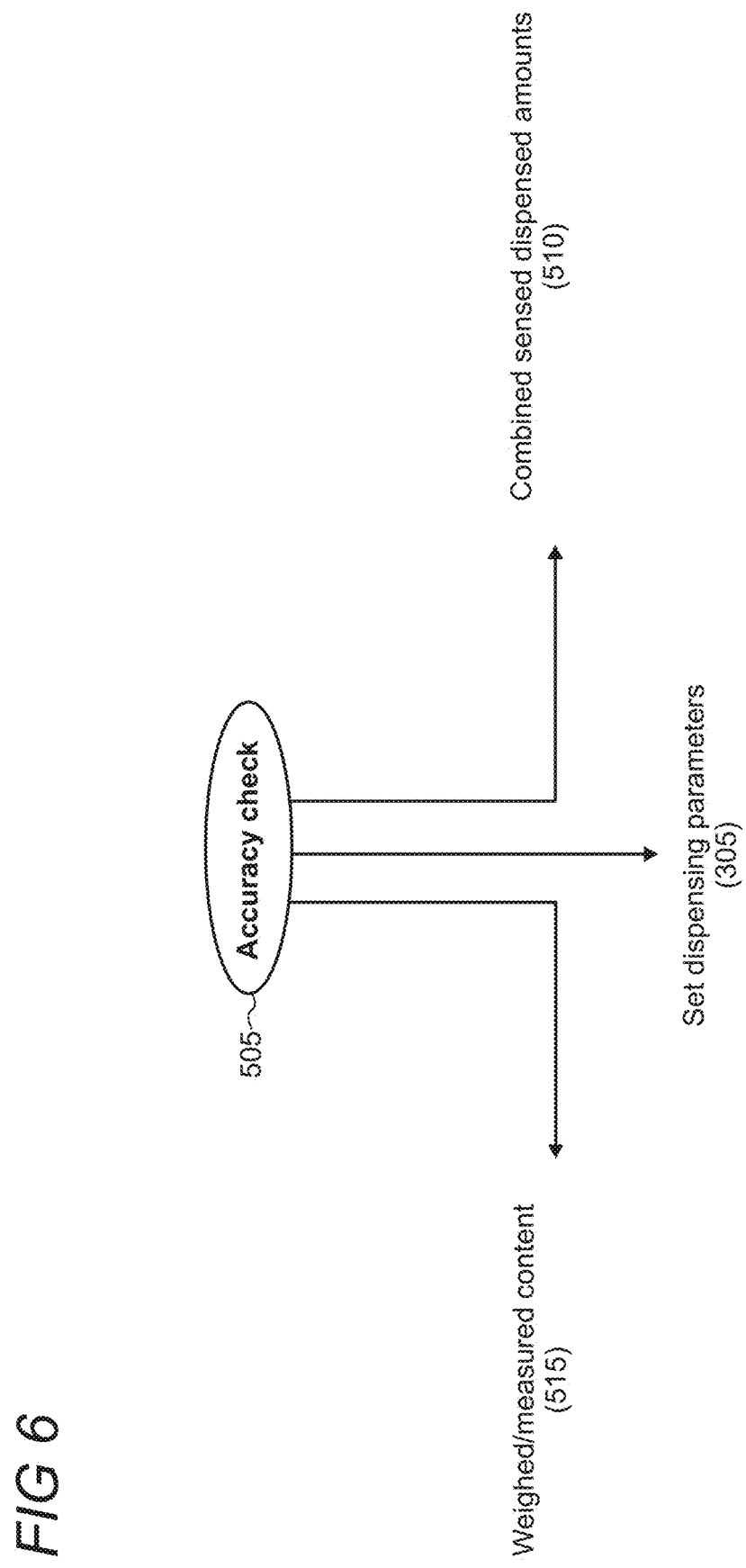
FIG. 6 shows an illustrative representation of measurements that the accuracy check application checks.

FIG. 6 shows a further illustrative representation of the accuracy check 505 function within the dispensing application 455 of the dispensing device 105. For example, the dispensing application may check the amounts between the weighed/measured content 515 of the prepared formula bottle 135 by the scale, the combined sensed dispensed amounts 510 by the formula and water dispensers, and the set dispensing parameters 305 (FIG. 3). Thus, the on-board system checks to ensure all three elements are properly aligned so that the prepared formula bottle is definitively checked, verified, and trusted.

Figure 7:
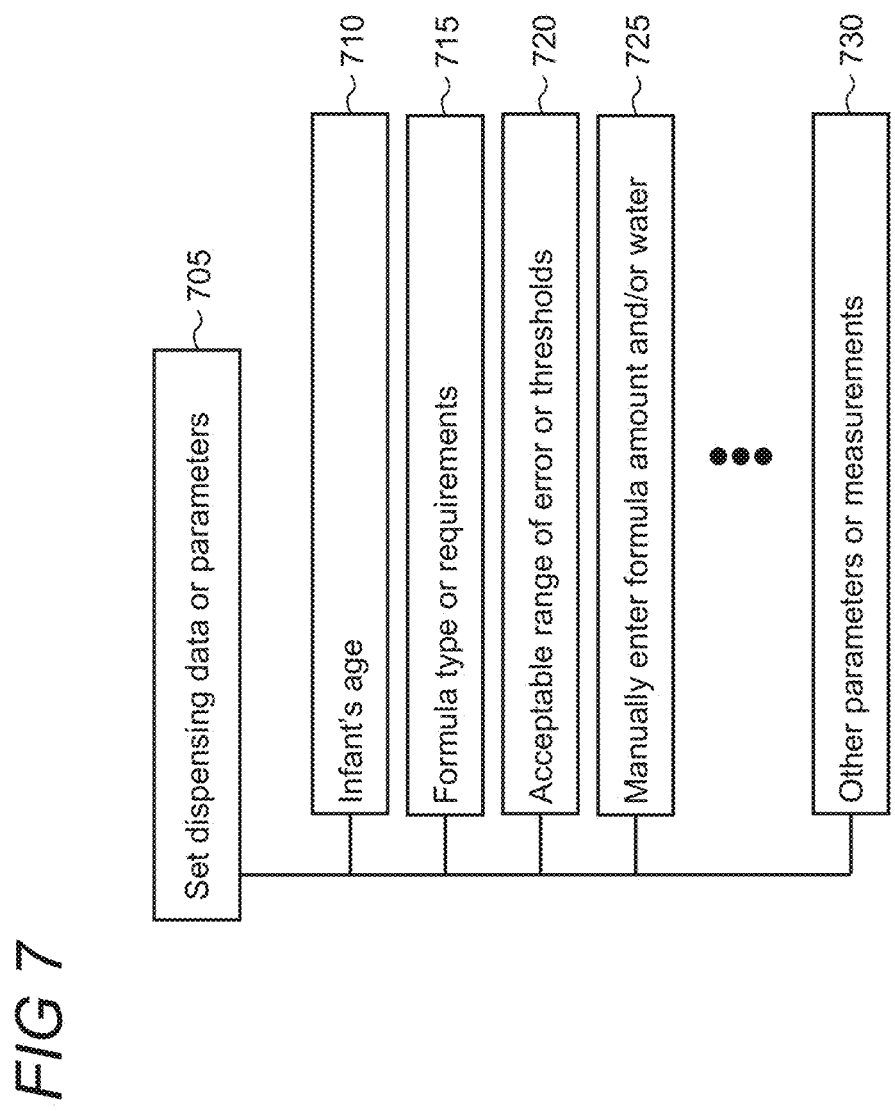
FIG. 7 shows an illustrative schema of dispensing data or parameters that dictate how much the bottle dispensing device dispenses when creating a bottle.

FIG. 7 shows an illustrative schema of set dispensing data or parameters 705 for the dispensing device 105. These parameters may be data used to automatically output/dispense a prepared formula bottle, or may otherwise be used to guide the user in manually setting the dispensing parameters. Such rules or requirements include an infant's age 710, formula type or requirements 715 (e.g., brand, composition, manufacturer's recommendation), acceptable range of error or thresholds 720, manually enter formula amount and/or water 725, and other parameters or measurements 730.

Figure 8:
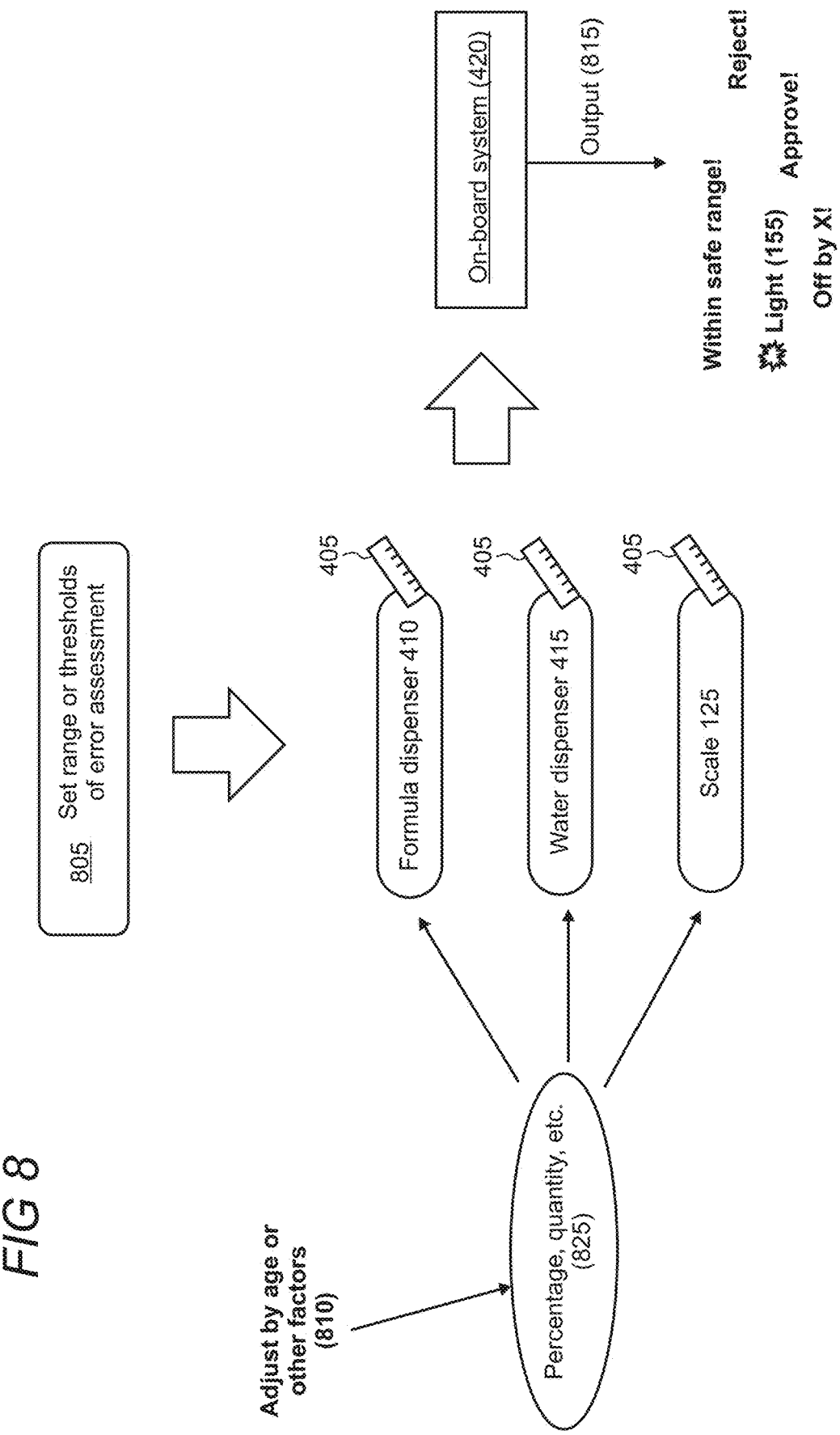
FIG. 8 shows an illustrative representation of the bottle dispensing device utilizing a range or threshold when checking the accuracy of a bottle.

FIG. 8 shows an illustrative representation with a set of acceptable ranges or thresholds of error 805. The manufacturer may pre-set the range of error or thresholds, automatically calculated or determined, or manually entered by the user. Typically, an upper and lower range may be used, but in some cases, a single lower or upper threshold may be used. Any pre-set or otherwise set parameters, such as via the remote service 420, may be done per formula type, which may be separated by brands or another unique formula characteristic. This information can be input into the dispensing application 455 so that the system knows how much water and formula to dispense based on the formula type used and the baby's physiological information (e.g., age, weight, height, etc.).

An acceptable range or thresholds of error 805 may be set for any one or each of the formula dispenser 410, water dispenser 415, and scale 125. Such error range or one or more thresholds may be by a percentage, quantity, or other metric, as representatively shown by reference numeral 825. Such ranges may also be modified or affected by the baby's age or other factors 810, including physiological characteristics like height or weight, a doctor's recommendations, the size of the prepared bottle, etc. For example, an acceptable range or threshold for error may be affected based on the dispensed amount, that is, an acceptable difference of 0.05 is much more different for a two-ounce prepared bottle versus an eight-ounce prepared bottle.

Once the dispensing device 105 dispenses the prepared formula bottle, the on-board system 420—relying on the received sensory data from the sensors 405 (the scale 125 can be considered a sensor 405), and the system outputs 815 some message to the user regarding the sensed amounts. Exemplary output messages 815 are shown in FIG. 8, including that the bottle is within a safe range, the user should reject the prepared bottle, that the prepared bottle is approved, that the bottle is off by some X amount, and/or one or more lights 155 may go off indicating the results to the user (e.g., red light for reject, green light for accept, and yellow light to indicate the bottle is within an acceptable range). Other outputs are also possible. Such outputs may be done using the various I/O devices described herein, including using one or more of speakers (e.g., an error or approved sound), the screen 150, a notification to the user's computing device 450, a light output, among other outputs that effectuate the features discussed herein.

Figure 9:
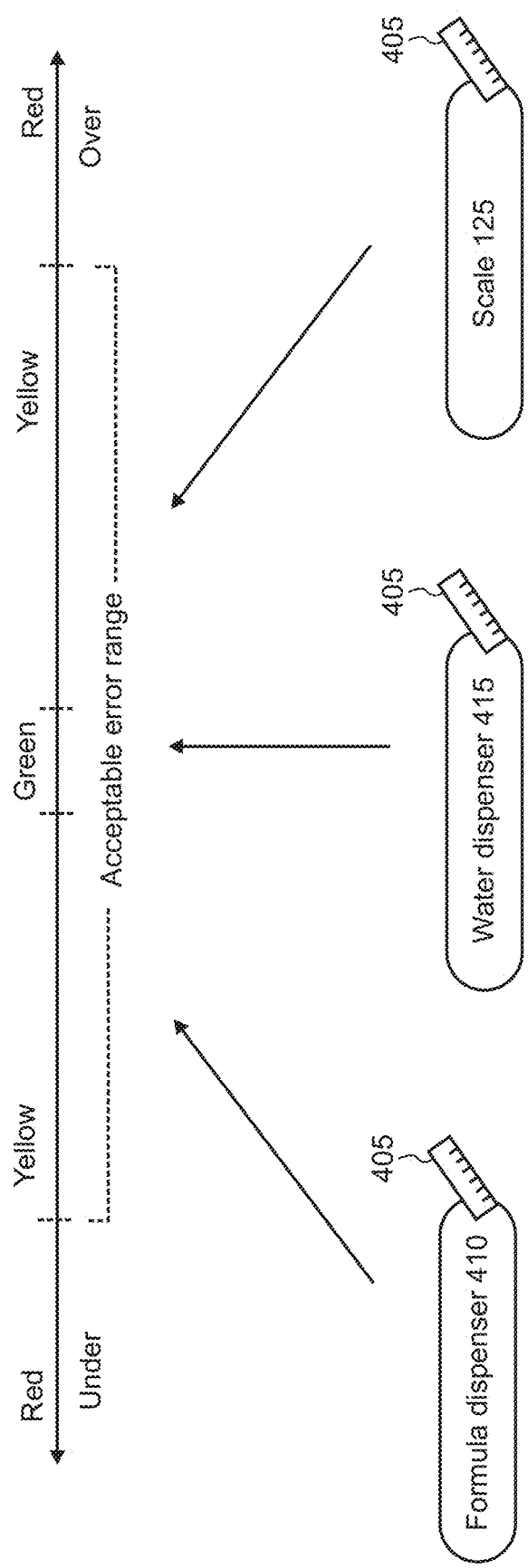
FIG. 9 shows an illustrative representation of the bottle dispensing device's results based on the range detected for the measurements.

FIG. 9 shows an illustrative representation in which the dispensing application 455 is configured with output mechanisms based on the acceptable error range or thresholds. For example, a green output light may indicate that the prepared formula bottle 135 is virtually perfect (e.g., either an exact amount or within a small difference). The yellow output light may indicate that the prepared formula bottle is safe to drink and within the acceptable error range or thresholds set (FIG. 8). In this regard, acceptable error ranges and thresholds may be set for multiple outputs, such as small differences that are nominal enough to still be virtually perfect for the green output, or a slightly greater difference for yellow light outputs.

Such configurations may be entered as discussed above with respect to FIG. 8, but alternatively, other error ranges may be automatically input. For example, if the yellow acceptable range is 0.5 mL off the target amount, then the green acceptable range may automatically calculate to be within 80% of that range, such as 0.1 mL. While the colors red, yellow, and green are discussed and shown with respect to FIG. 9, this is exemplary only and used for clarity in exposition. However, other connotations for such differences are also possible, such as small, medium, or large, only two categories (e.g., yellow and red), or even "Approved" or "Rejected." Finally, any measured amounts outside of the green and yellow ranges may be red to indicate to the user that the amounts are sufficiently off that they should discard the bottle's contents and not use it. In short, the output may be configured as any one or more indications that the bottle is safe, unsafe, within a safe range, or using some other scale, such as a percentage from 0-100%.

Figure 10:
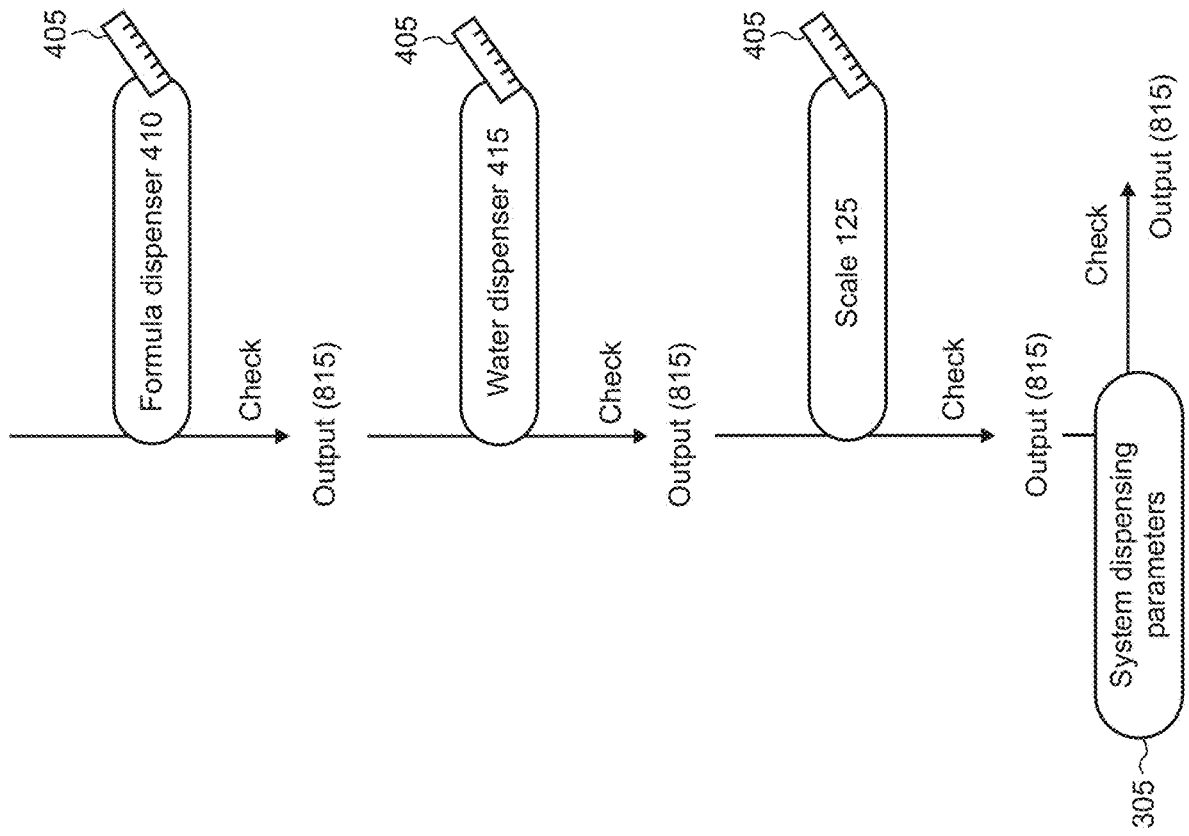
FIG. 10 shows an illustrative representation of the bottle dispensing device's outputs after each accuracy check.

FIG. 10 shows an illustrative representation in which the dispensing device 105 may provide outputs 815 at various stages in the dispensing process. For example, sensor 405 for the formula dispenser 410 may be checked by the on-board system 420 to ensure that the measured amount is accurate (e.g., the sensed amount aligns with the input or received dispensing parameters 305 (FIG. 3). Depending on the results of the check (e.g., within or outside an acceptable error range or thresholds), the dispensing application 455 on the dispensing device 105 provides some output to the user, whether lights, auditory sound, display message, etc.

This process repeats itself for the water dispenser 415 and its associated sensor 405, and the scale 125 and its associated sensor 405 (the scale is considered a sensor). Each sensed amount is checked with the on-board system 420 to ensure the sensed amount aligns with the desired output amounts in the received dispensing parameters 305 at the dispensing device 105. The scale, however, may be checked with one or multiple checkpoints, including whether the weighed total corresponds with the combined total of the formula dispenser 410 and water dispenser 415, and/or whether the weighed amount corresponds with the received dispensing parameters 305. Finally, the system dispensing parameters 305 may be checked against each sensed amount for the formula, water, and scale. This may be a final check to inform the user that the dispensed amounts and total prepared formula bottle align with the dispensing parameters.

After each stage, the on-board system 420 provides an output 815 to the user so that the user can see that the system is performing these checks during bottle preparation and creation, as opposed to the user receiving one output indicating that the prepared bottle 135 is safe. While a single output may also be sufficient, at least in some implementations, an output may be provided for each isolated stage or component.

Furthermore, the final output 815 by the scale or received system dispensing parameters 305 may differ based on the formula and water dispenser checks. For example, if the formula and water dispenser checks are each in the "yellow" acceptable range, then it is possible that the final prepared bottle is outside of the yellow range and in the red (reject) range. This may happen if each of the water and formula dispensers is near the end of the acceptable range or thresholds of error, but combined, they cause the fully prepared formula bottle to go beyond the red.

In some implementations, the system may also suggest an error correction to the prepared formula bottle. For example, if the system measured that the formula or water output is at X+2, then correcting the bottle may be possible by manually adding more formula or water to the bottle. Alternatively, the on-board system 420 may identify such differences, and automatically or responsive to user input approval, output additional formula or water into the bottle to put the prepared bottle within a safe range to ingest. For example, the on-board system, after receiving and processing the sensed amounts by the sensors 405 (including the scale), may determine that the reason for the error is due to too much formula or water, which can be corrected by adding a certain additional amount of water or formula to offset the difference safely. The system may ask the user for approval before doing so. In such situations, corrections may also go through the check system shown in FIG. 10, including an output for any additional dispensed ingredient, and then the scaled amount and system dispensing parameters, which may have been updated to check the correction. Thus, the new system dispensing parameters may update the originally approved system.

Figure 11:
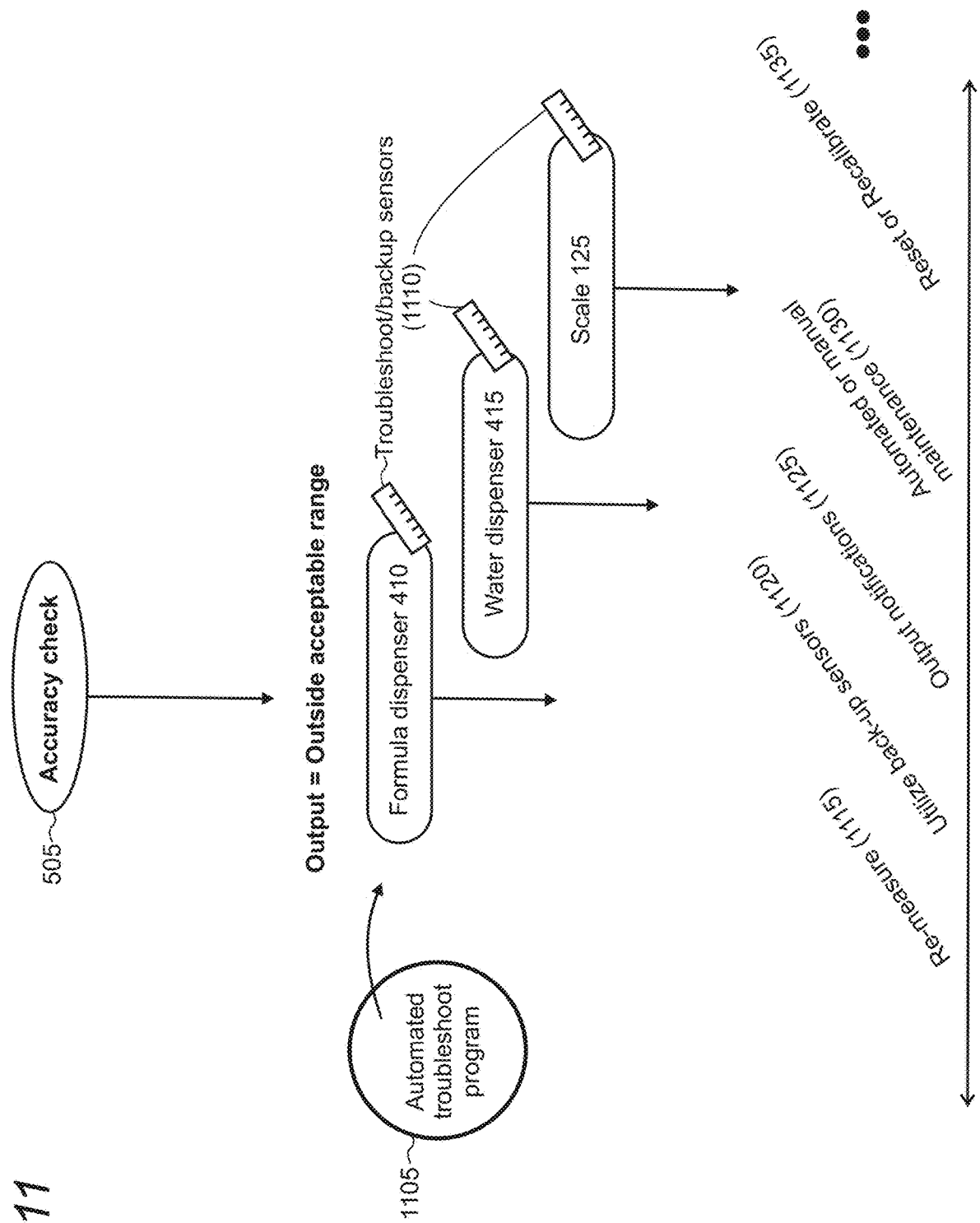
FIG. 11 shows an illustrative representation of the bottle dispensing device's automated troubleshooting if any of the accuracy checks are outside the permissible range.

FIG. 11 shows an illustrative representation in which the dispensing device 105 may implement an automated troubleshoot program 1105 if the accuracy check 505 system resulted in an output 815 that one or more sensors indicated the dispensed amounts were outside an acceptable range or thresholds. The automated troubleshoot program may perform checks on one or more of the formula dispenser 410, water dispenser 415, or scale 125. The troubleshooting program may only focus on dispensers that were sensed to be outside an acceptable range, or may focus on each sensed section to ensure proper overall functioning. Furthermore, the troubleshooting program may be utilized when a prepared formula bottle is outside the "green" range, so that correction mechanisms are executed as soon as possible before the issue escalates.

In the troubleshooting context, the dispensing device 105 may be configured with one or more additional troubleshoot/backup sensors 1110, each associated with its specific stage or function, to check the formula or water dispensers 410, 415, or scale 125. These backup sensors may be utilized to check the system's operations. These backup sensors may be the same types of sensors or different sensors from the sensors 405 that are used to measure the amounts. For example, if they are the same sensors, they may be used to double-check the accuracy or proper functioning of the sensors 405.

Different sensors may be used to investigate issues with the dispensing mechanisms. For example, an in-line flowmeter-turbine, MEMS thermal-mass, or miniature ultrasonic-mounted between the reservoir outlet and the mixing nozzle establishes a real-time baseline for every dispense. The on-board system 420 compares the live pulse or analog signal to the reference delivery curve; any unexplained drop in flow rate, or the absence of pulses altogether, indicates a pin-hole leak, upstream blockage, pump stall, or an empty tank. A pressure transducer installed just downstream of the pump provides a second layer of protection: a sudden pressure loss signals a cracked hose or loose clamp, whereas a pressure spike reveals a downstream obstruction. To guard against invisible air ingress, an ultrasonic "air-in-line" bubble sensor can be snapped over the silicone tube; repeated bubbles after priming indicate a puncture or exhausted reservoir. Finally, a low-cost capacitive leak pad in the drip tray changes impedance when water drips into the chassis, flagging leaks that flow and pressure sensors might miss.

The powder dispensing circuit-typically an auger screw or gravity hopper benefits from weight- and torque-based monitoring. Mounting the hopper on three or four low-profile shear-beam load cells lets the on-board system 420 watch the mass of formula in real time. When the auger runs, the processor 425 expects to see a smooth $\Delta m/\Delta t$; if the weight fails to drop, a bridge or clog may have formed, while an unexpected drop during idle suggests a crack or loose joint. An encoder or motor-current sensor on the auger drive complements the weigh cells: a spike in current reveals compaction or a jam, whereas free-wheeling indicates the hopper is empty or a coupling has sheared. Where the powder path may typically remain sealed, a clamp-on microwave or optical bulk-flow sensor around a straight section of chute can confirm that a dense powder stream is actually passing through.

Both circuits are wired to a PCB (printed circuit board) of the on-board system 420 with shielded, food-grade cables, and sensors are configured "normally closed" so a broken wire creates a detectable fault. During manufacturing, the system stores a golden flow-pressure and weight profile; the on-board system, such as at the firmware level or at the dispensing application 455, outputs some error or alarm when live signatures drift beyond permitted tolerances. By combining flow, pressure, bubble, and leak detection for water with weight, torque, and bulk-flow sensing for powder, the dispensing device 105 can alert the user of the issue whenever a line punctures, a hose loosens, or an auger clogs, ensuring every bottle is prepared safely and accurately.

Turning back to FIG. 11, various tasks may be performed by the automated troubleshooting program 1105, which may be part of the dispensing application 455. Exemplary but non-exhaustive tasks performed by the troubleshooting application include re-measuring 1115 the various levels, whether via the existing sensors 405 or the backup sensors 1110. Re-measuring may quickly help the user and on-board system 420 realize that the issue may have been a one-time occurrence (such as a minor clog or backup in the reservoir or hosing, among other issues). Another troubleshooting task can include utilizing the back-up sensors 1120, which may include performing a re-measurement operation or attempting to detect problems in the formula or water dispensing circuits (e.g., holes in a tube). A pressure sensor may be one exemplary sensor that can be employed to check that proper or consistent, and expected pressure is output at the water and formula dispensers. Other backup sensors are also possible.

Another troubleshooting task includes outputting notifications 1125 to the user regarding the issue. This may include outputs using the dispensing device 105 or transmitted over a network to the user computing device 450. The notification may include information on how the user can manually correct the issues, or can otherwise implement some automated correction measures, such as re-measuring 1115 or utilizing back-up sensors 1120 to identify the dispensing circuit issue.

Another troubleshooting task can include an automated or manual maintenance 1130 on the dispensing device 105. For manual maintenance, the dispensing device may instruct the user on maintenance tasks, such as replacing hoses, cleaning hoses with a solution, emptying reservoirs, or other maintenance solutions for dispensing units. Alternatively, such solutions may be automated. For example, the system may automatically clean the water dispenser 415 by pushing fluid at a higher rate to clean the hose. A similar system may be used for the formula dispenser, but using air or fluid that may be connected to some water/fluid reservoir, such as reservoir 120. This may help clean the various components to ensure a clean and unclogged system. Finally, a troubleshooting task can include resetting or recalibrating 1135 the dispensing device 105. This may include shutting off the power to the dispensing device, or recalibrating the various sensors 405 and scale 125. Other troubleshooting tasks are also possible.

Figure 12:
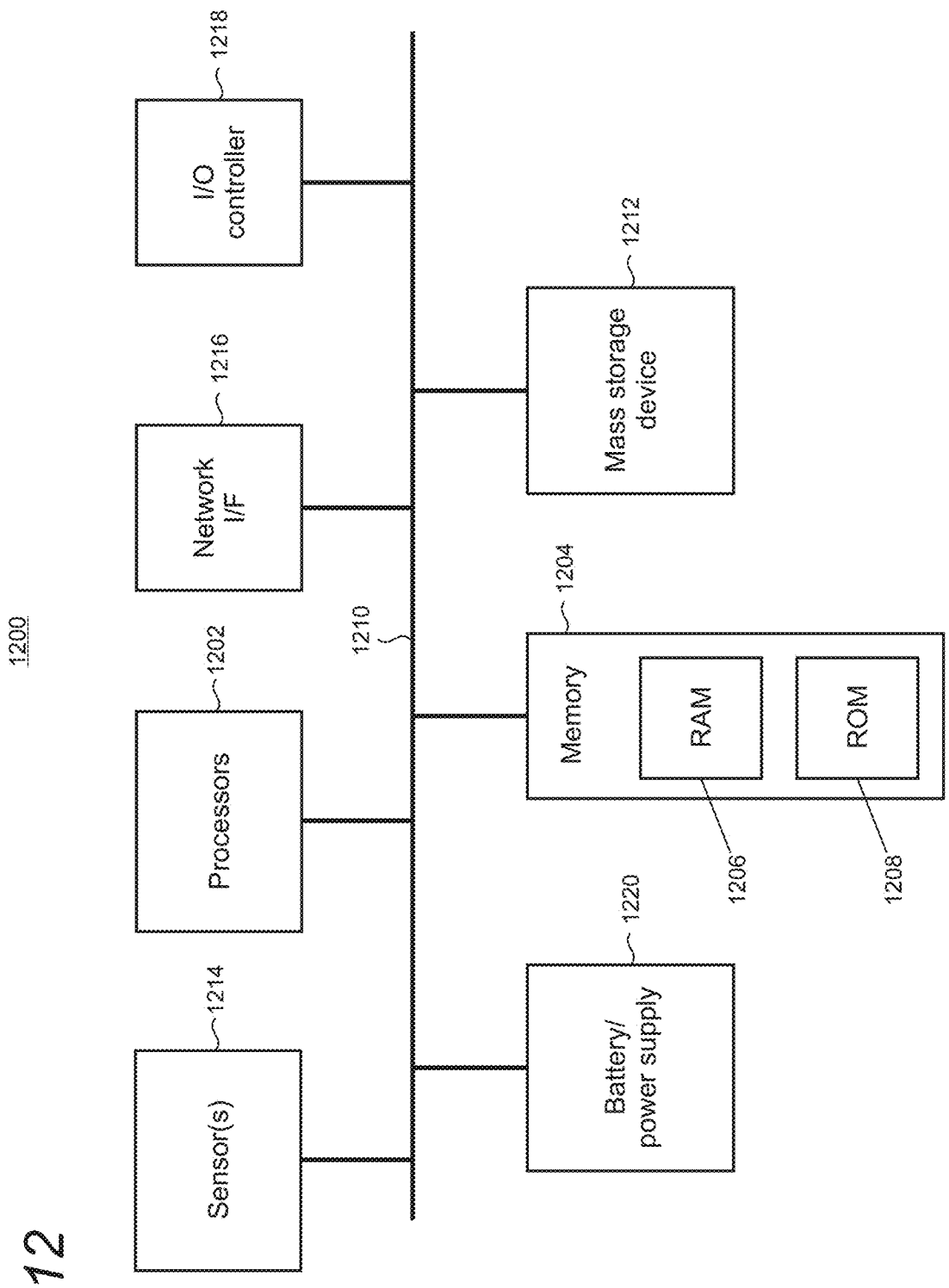
FIG. 12 shows a simplified block diagram of a computing device, such as the dispensing device or other computing devices discussed herein, that may be used to implement the present baby formula dispenser with accuracy verification; and Like reference numerals indicate like elements in the drawings. Elements are not drawn to scale unless otherwise indicated.

FIG. 12 shows an illustrative architecture 1200 for computing devices, such as the dispensing device 105 or user computing devices 450, capable of executing the various features described herein. The architecture 1200 illustrated in FIG. 12 includes one or more processors 1202 (e.g., central processing unit, dedicated AI chip, graphics processing unit, etc.), a system memory 1204, including RAM (random access memory) 1206, ROM (read-only memory) 1208, and long-term storage devices 1212. The system bus 1210 operatively and functionally couples the components in the architecture 1200. A basic input/output system containing the basic routines that help to transfer information between elements within the architecture 1200, such as during start-up, is typically stored in the ROM 1208. The architecture 1200 further includes a long-term storage device 1212 for storing software code or other computer-executed code that is utilized to implement applications, the file system, and the operating system. The storage device 1212 is connected to processor 1202 through a storage controller (not shown) connected to bus 1210. The storage device 1212 and its associated computer-readable storage media provide non-volatile storage for the architecture 1200. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1200, including solid-state drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), BEPROM (electrically erasable programmable read-only memory), Flash memory or other solid-state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 may also be utilized to connect to other types of networks and remote computer systems. The architecture 1200 also may include an input/output controller 1218 for receiving and processing input from a number of other devices, including a keyboard, mouse, touchpad, touchscreen, control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that any software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Various exemplary embodiments are described herein. In one exemplary embodiment, implemented is a prepared formula dispensing device, comprising: one or more processors; one or more hardware-based memory devices storing computer-executable instructions which, when executed by the one or more processors, cause the prepared formula dispensing device to: set dispensing parameters for the prepared formula dispensing device; set an acceptable range or threshold of error for one or both of a water dispenser or a formula dispenser; dispense formula and water into a bottle; measure, using one or more sensors within the prepared formula dispensing device, a dispensed amount of formula from the formula dispenser, water from the water dispenser, or a combined amount of formula and water; and determine whether the measured dispensed amounts for the water, formula, or combined amounts of water and formula are within the acceptable range or threshold of error.

In another example, the set dispensing parameters include an amount of formula or water to dispense. As another example, the executed instructions further cause the prepared formula dispensing device to output, at the prepared formula dispensing device, whether the measured dispensed amounts for the water, formula, or combined amount of water and formula are within the acceptable range or threshold of error. As another example, the determining whether the measured dispensed amounts are within the acceptable range or threshold of error is performed by comparing the measured dispensed amounts to the set dispensing parameters. As a further example, the one or more sensors include: a water dispensing sensor associated with the water dispenser; a formula dispensing sensor associated with the formula dispenser; and a scale associated with a platform on which the bottle rests, and wherein the determining whether the measured dispensed amounts are within the acceptable range or threshold of error is performed by comparing a weight of the bottle measured by the scale with an amount of water and formula measured by the water dispensing sensor and the formula dispensing sensor. As another example, the one or more sensors include: a water dispensing sensor associated with the water dispenser; a formula dispensing sensor associated with the formula dispenser; and a scale associated with a platform on which the bottle rests, and wherein the prepared formula dispensing device provides an output at an output device associated with the prepared formula dispensing device, for each measured amount from the water dispensing sensor, formula dispensing sensor, and scale. As a further example, the provided output includes at least two categories, including an indication that a prepared bottle is safe or unsafe. In another example, the provided output includes a category between safe or unsafe.

In another exemplary embodiment, implemented is a method performed by a prepared formula dispensing device, comprising: setting dispensing parameters for the prepared formula dispensing device; setting an acceptable range or threshold of error for one or both of a water dispenser or a formula dispenser; measuring, using one or more sensors associated with the prepared formula dispensing device, a dispensed amount of formula from the formula dispenser, water from the water dispenser, or a combined amount of formula and water; and determining whether the measured dispensed amounts for the water, formula, or combined amounts of water and formula are within the acceptable range or threshold of error.

As another example, the set dispensing parameters include an amount of formula or water to dispense. In another example, the executed instructions further cause the prepared formula dispensing device to output, at the prepared formula dispensing device, whether the measured dispensed amounts for the water, formula, or combined amount of water and formula are within the acceptable range or threshold of error. As another example, the determining whether the measured dispensed amounts are within the acceptable range or threshold of error is performed by comparing the measured dispensed amounts to the set dispensing parameters. In another example, the one or more sensors include: a water dispensing sensor associated with the water dispenser; a formula dispensing sensor associated with the formula dispenser; and a scale associated with a platform on which the bottle rests, and wherein the determining whether the measured dispensed amounts are within the acceptable range or threshold of error is performed by comparing a weight of the bottle measured by the scale with an amount of water and formula measured by the water dispensing sensor and the formula dispensing sensor. As another example, the one or more sensors include: a water dispensing sensor associated with the water dispenser; a formula dispensing sensor associated with the formula dispenser; and a scale associated with a platform on which the bottle rests, and wherein the prepared formula dispensing device provides an output at an output device associated with the prepared formula dispensing device, for each measured amount from the water dispensing sensor, formula dispensing sensor, and scale. In another example, the provided output includes at least two categories, including an indication that a prepared bottle is safe or unsafe.

In another exemplary embodiment, implemented is one or more hardware-based non-transitory computer-readable memory devices including instructions which, when executed by one or more processors disposed within a prepared formula dispensing device, causes the device to: set dispensing parameters for the prepared formula dispensing device; set an acceptable range or threshold of error for one or both of a water dispenser or a formula dispenser; dispense formula and water into a bottle; measure, using one or more sensors within the prepared formula dispensing device, a dispensed amount of formula from the formula dispenser, water from the water dispenser, or a combined amount of formula and water; and determine whether the measured dispensed amounts for the water, formula, or combined amounts of water and formula are within the acceptable range or threshold of error. As another example, the set dispensing parameters include an amount of formula or water to dispense. In another example, the executed instructions further cause the prepared formula dispensing device to output, at the prepared formula dispensing device, whether the measured dispensed amounts for the water, formula, or combined amount of water and formula are within the acceptable range or threshold of error. As another example, the determining whether the measured dispensed amounts are within the acceptable range or threshold of error is performed by comparing the measured dispensed amounts to the set dispensing parameters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A prepared formula dispensing device, comprising:
   one or more processors;
   one or more hardware-based memory devices storing computer-executable instructions which, when executed by the one or more processors, cause the prepared formula dispensing device to:
   set dispensing parameters for the prepared formula dispensing device;
   set an acceptable range or threshold of error for one or both of a water dispenser or a formula dispenser;
   dispense formula and water into a bottle;
   measure, using one or more sensors within the prepared formula dispensing device, a dispensed amount of formula from the formula dispenser, water from the water dispenser, or a combined amount of formula and water;

determine whether the measured dispensed amounts for the water, formula, or combined amounts of water and formula are within the acceptable range or threshold of error; and a water dispensing sensor associated water dispenser;

a formula dispensing sensor associated the formula dispenser; and a scale associated with a platform on which the bottle rests, and wherein the determining whether the measured dispensed amounts are within the acceptable range or threshold of error is performed by comparing a weight of the bottle measured by the scale with an amount of water and formula measured by the water dispensing sensor and the formula dispensing sensor.

2. The prepared formula dispensing device of claim 1, wherein the set dispensing parameters include an amount of formula or water to dispense.

3. The prepared formula dispensing device of claim 1, wherein the executed instructions further cause the prepared formula dispensing device to output, at the prepared formula dispensing device, whether the measured dispensed amounts for the water, formula, or combined amount of water and formula are within the acceptable range or threshold of error.

4. The prepared formula dispensing device of claim 1, wherein the determining whether the measured dispensed amounts are within the acceptable range or threshold of error is performed by comparing the measured dispensed amounts to the set dispensing parameters.

5. The prepared formula dispensing device of claim 1, wherein the one or more sensors include:
   a water dispensing sensor associated with the water dispenser;
   a formula dispensing sensor associated with the formula dispenser; and
   a scale associated with a platform on which the bottle rests, and
   wherein the prepared formula dispensing device provides an output at an output device associated with the prepared formula dispensing device, for each measured amount from the water dispensing sensor, formula dispensing sensor, and scale.

6. The prepared formula dispensing device of claim 5, wherein the provided output includes at least two categories, including an indication that a prepared bottle is safe or unsafe.

7. The prepared formula dispensing device of claim 6, wherein the provided output includes a category between safe or unsafe.

8. A method performed by a prepared formula dispensing device, comprising:
   setting dispensing parameters for the prepared formula dispensing device;
   setting an acceptable range or threshold of error for one or both of a water dispenser or a formula dispenser;
   measuring, using one or more sensors associated with the prepared formula dispensing device, a dispensed amount of formula from the formula dispenser, water from the water dispenser, or a combined amount of formula and water; and
   determining whether the measured dispensed amounts for the water, formula, or combined amounts of water and formula are within the acceptable range or threshold of error;
   measuring, with a water dispensing sensor associated with the water dispenser, an amount of water dispensed into the bottle;
   measuring, with a formula dispensing sensor associated with the formula dispenser, an amount of formula dispensed into the bottle;
   measuring, with a scale associated with a platform on which the bottle rests, a combined amount of water and formula dispensed into the bottle; and
   determining, by one or more processors, whether the measured amounts from the water dispensing sensor and the formula dispensing sensor correspond to the combined amount measured by the scale and whether the measured dispensed amounts are within an acceptable range or threshold of error.

9. The method of claim 8, wherein the set dispensing parameters include an amount of formula or water to dispense.

10. The method of claim 8, wherein the executed instructions further cause the prepared formula dispensing device to output, at the prepared formula dispensing device, whether the measured dispensed amounts for the water, formula, or combined amount of water and formula are within the acceptable range or threshold of error.

11. The method of claim 8, wherein the determining whether the measured dispensed amounts are within the acceptable range or threshold of error is performed by comparing the measured dispensed amounts to the set dispensing parameters.

12. The method of claim 8, wherein the one or more sensors include:
   a water dispensing sensor associated with the water dispenser;
   a formula dispensing sensor associated with the formula dispenser; and
   a scale associated with a platform on which the bottle rests, and
   wherein the prepared formula dispensing device provides an output at an output device associated with the prepared formula dispensing device, for each measured amount from the water dispensing sensor, formula dispensing sensor, and scale.

13. The method of claim 12, wherein the provided output includes at least two categories, including an indication that a prepared bottle is safe or unsafe.

14. One or more hardware-based non-transitory computer-readable memory devices including instructions which, when executed by one or more processors disposed within a prepared formula dispensing device, causes the device to:
   set dispensing parameters for the prepared formula dispensing device;
   set an acceptable range or threshold of error for one or both of a water dispenser or a formula dispenser;
   dispense formula and water into a bottle;
   measure, using one or more sensors within the prepared formula dispensing device, a dispensed amount of formula from the formula dispenser, water from the water dispenser, or a combined amount of formula and water; and
   determine whether the measured dispensed amounts for the water, formula, or combined amounts of water and formula are within the acceptable range or threshold of error;
   measure, with a water dispensing sensor associated with the water dispenser, a measured amount of water dispensed into the bottle;
   measure, with a formula dispensing sensor associated with the formula dispenser, a measured amount of formula dispensed into the bottle;

measure, with a scale associated with a platform on which the bottle rests, a measured combined amount of water and formula dispensed into the bottle; and determine, by the one or more processors, whether the measured amounts from the water dispensing sensor and the formula dispensing sensor correspond to the combined amount measured by the scale and whether the measured dispensed amounts are within an acceptable range of threshold of error.

15. The one or more hardware-based non-transitory computer-readable memory devices of claim 14, wherein the set dispensing parameters include an amount of formula or water to dispense.

16. The one or more hardware-based non-transitory computer-readable memory devices of claim 14, wherein the executed instructions further cause the prepared formula dispensing device to output, at the prepared formula dispensing device, whether the measured dispensed amounts for the water, formula, or combined amount of water and formula are within the acceptable range or threshold of error.

17. The one or more hardware-based non-transitory computer-readable memory devices of claim 14, wherein the determining whether the measured dispensed amounts are within the acceptable range or threshold of error is performed by comparing the measured dispensed amounts to the set dispensing parameters.

\* \* \* \* \*